US009928711B2

United States Patent
Clifford

(10) Patent No.: US 9,928,711 B2
(45) Date of Patent: Mar. 27, 2018

(54) CAMPUS CRIME NEUTRALIZATION METHOD USING DUAL-TONE MULTI-FREQUENCY ENHANCED 2-WAY RADIO

(71) Applicant: David G. Clifford, Albuquerque, NM (US)

(72) Inventor: David G. Clifford, Albuquerque, NM (US)

( * ) Notice: Subject to any disclaimer, the term of this patent is extended or adjusted under 35 U.S.C. 154(b) by 158 days.

(21) Appl. No.: 15/068,720

(22) Filed: Mar. 14, 2016

(65) Prior Publication Data

US 2017/0263096 A1 Sep. 14, 2017

(51) Int. Cl.
| | | |
|---|---|---|
| *H04W 4/22* | (2009.01) | |
| *G08B 21/02* | (2006.01) | |
| *H04B 1/3827* | (2015.01) | |
| *H04B 7/155* | (2006.01) | |
| *G08B 15/02* | (2006.01) | |

(52) U.S. Cl.
CPC .......... *G08B 21/02* (2013.01); *G08B 15/02* (2013.01); *H04B 1/3833* (2013.01); *H04B 7/15507* (2013.01); *H04W 4/22* (2013.01)

(58) Field of Classification Search
CPC ...... H04W 4/22; H04W 76/007; G08B 21/02; G08B 15/02; H04B 1/3833; H04B 7/15507
USPC .................................................. 340/539.11
See application file for complete search history.

(56) References Cited

U.S. PATENT DOCUMENTS

| | | | |
|---|---|---|---|
| 5,903,216 A | 5/1999 | Sutsos et al. | |
| 7,277,018 B2 | 10/2007 | Reyes et al. | |
| 7,813,750 B2 | 10/2010 | Hobby et al. | |
| 7,965,231 B2* | 6/2011 | Kirmuss | G01C 21/20 |
| | | | 342/357.34 |
| 8,588,733 B2 | 11/2013 | Ferguson et al. | |
| 8,873,719 B2 | 10/2014 | Clawson | |
| 2007/0188010 A1* | 8/2007 | Miller | B60P 1/56 |
| | | | 298/29 |
| 2008/0153415 A1* | 6/2008 | Block | H04B 7/15528 |
| | | | 455/15 |
| 2014/0306802 A1 | 10/2014 | Hibbs, Jr. | |
| 2015/0170486 A1 | 6/2015 | Penland | |
| 2015/0204109 A1 | 7/2015 | Ergenbright | |
| 2015/0215755 A1 | 7/2015 | Bekaich et al. | |
| 2015/0379861 A1 | 12/2015 | Demara, II et al. | |
| 2016/0006870 A1 | 1/2016 | Merjanian et al. | |
| 2017/0154521 A1* | 6/2017 | Zamorano-Larrate | G08B 25/016 |
| 2017/0251347 A1* | 8/2017 | Mehta | H04W 4/22 |

* cited by examiner

*Primary Examiner* — Albert Wong
(74) *Attorney, Agent, or Firm* — David G. Clifford

(57) ABSTRACT

Disclosed is a Crime on Campus Neutralization System comprising a communication network of 2-way radios connecting a USER to a USER-REPEATER, subsequently to a LINK-REPEATER, enabling a USER to ultimately initiate a LOCK-DOWN procedure on a CAMPUS. Further disclosed, here within, are methods that enable the system to work effectively. This system is very cost effective, consisting of components that can be bought off the shelf. The system is unique in that it does not use the internet, a cell-phone device, a tablet, a computer, or any other device that, by its design, could be "hacked" or "compromised" by outside parties. The system is not complex, unlike other systems which rely on extensive software programs, but instead relies on a 6 decade proven technology.

7 Claims, 8 Drawing Sheets

CAMPUS CRIME NEUTRALIZATION METHOD USING DUAL-TONE MULTI-FREQUENCY ENHANCED 2-WAY RADIO

CROSS REFERENCE TO RELATED APPLICATIONS none

BACKGROUND OF THE INVENTION

Field of the Invention

The present invention relates to a apparatus and a process by which a individual using a 2-way portable radio may neutralize a campus crime perpetrator using currently available 2-way radio technology assembled in a unique fashion to best solve the ongoing problem of how to stop the increasing number of persons being killed or maimed on grade schools, high schools, colleges, entertainment and business CAMPUSes. Without using of the internet, of a WI-FI device, a cellular phone, a tablet, a computer, or a Graphic User Interface (GUI), the present invention solves this problem in a very cost effective manner, by assembling various components in a unique fashion and by employing the system of these components in a unique process that can be installed and maintained by and only a moderately skilled service person.

Description of Prior Art

U.S. application patent 2016/0006870 to Merjanian; Vic et al., describes a community safety and health communication and notification system. The patent application is restricted to a notification system throughout a specific community that provides two-way communications between users and administrators as to what they describe as direct police community interaction. This patent application is limited to a communication system and uses such communication devices as a mobile phone, a laptop, a desktops, a tablets, a wearable communication devices such as a Smartwatch or a PDA. The present invention does not use any of the before mentioned technologies, which are often prone to being "hacked" or being "compromised". In addition, the Merjanian invention does not use a conventional 2-way radio based system.

U.S. patent application 2015/0379861 to DeMaraa, II; Daniel Joseph, describes a system and method for automatic alert and lock down. The system is launched by an authorized user entering an authorization code on a device, which triggers an alert to law enforcement agencies and also initiates certain lock-down procedures, including visual and audio alarms. Further, in the patent's abstract it described the invention as using a "device each having an app installed therein for communication with the EMNS over a network". In the present invention, the inventor does not describe the use of any device using an app on a network, rather that the present invention uses a 2-way conventional 2-way radio system as its backbone. Further, the devices of the current patent application are of a conventional 2-way radio design, and not a tablet, a cell phone, a desktop computer, or any other device using a Web based network.

U.S. patent application 2015/0215755 to Bekanich, describes a school wide lock down and emergency communications system, further describing a graphic user interface (GUI) with a wireless device based on a one-way message to law enforcement over a restricted law enforcement radio frequency. The patent application further asserts in their claim 1 that the method shall comprise, "a computer-implemented method for communicating digital information comprising (the) sending an emergency message in a digital format from a location, the message directed to a least one 911/emergency dispatcher or law enforcement individual . . . ". In the Bekanich applied for patent, it is obvious that the inventor uses different mode of emergency transmission by using the Web, by cellular system, or by WI-FI network, none of which are used by the present inventor concept. What is deficient in the current patent is the notion that the use of the Internet is secure, and can not be "hacked" or "compromised".

The patent application to Ergenbright 20150204109 described a method and system for mitigating the effects of an active shooter. The application further described a method comprising an aggressor mitigating sequence that includes; automatically controlling ingress by one or more entry doors of a building; automatically notifying response personnel of the aggressor event; providing command and control functionality to the response personnel; and automatically broadcasting predetermined messages via one or more communication media. The patent application appears to describe a one-way communication system which both notifies responding personnel and automatically initiates a lock-down procedure. The device appears not to be human operated, but rather it activates by a device that detect the sound of gunfire. In the present inventor's patent application, the decision making is not done by an electronic detection device, but rather by a 2-way radio carrying person. Further, the present invention permits said 2-way radio user to activate "active shooter" counter measures by sending a predetermined code from a 2-way radio. Therefore, the present invention differs from that of patent by Ergenbright in that it is user initiated, not initiated by a detector.

U.S. patent application 2015/0170486 by Penland, describes a security system for identifying disturbances in a building. It further describes cameras and monitors, positionally located to record and transmit audio/visual information. The system describes two activation states—one for non-emergencies and one for emergencies, which allow a user to enter ID information to retrieve a weapon in a storage compartment. In the present invention, a campus crime perpetrator can be neutralized using the process described here within. The present inventor's patent would put 2-way radios in the hands of all teachers and administrative personnel, the radio capable of initiating a lock-down procedure.

U.S. patent application 2014/0306802 to Hibbs, Jr. describes an instant alert network system. The patent application relates to using a communications device such as a mobile phone to provide an instant alert or push button alert that is communicated via the Web to certain contacts within a contact base. The alert can be coded for different events. This Hibbs, Jr. patent depends on the use of the Web, whereas the present invention does not make use of said Web, nor does the present invention provide alerts only to "certain contacts within a data base". Furthermore, the current invention relies on 6 decades of proven technology that works independent of an Web, cell phone, WI-FI, or other networked technology, of which is prone to being "hacked" or to being "compromised". Further, the Hibbs, Jr. patent application does not begin to address any process or method to neutralize a crime perpetrator, but only alerts persons to the happening of same, nor does it enable any crime perpetrator neutralizing devices, nor does it connect any USER directly to to any 911 operator, nor does it directly interconnect a user to a first responder on responder's emergency radio.

U.S. Pat. No. 8,873,719 to Clawson, described an active assailant protocol for emergency dispatch. However, the patent is limited to providing emergency protocol interrogation instructions and information for guiding a dispatcher during an emergency call. This patent has little or no relevance to the present inventor's claims, in that is does not use a conventional 2-way radio based communications system, nor does it use a auto-phone patch (a device for interconnecting a radio to a Telco phone line), nor does it doesn't permit users to talk among themselves during an emergency event, nor does it suggest methods to neutralize a crime perpetrator once her or she has gain access to a campus.

U.S. Pat. No. 8,588,733 to Ferguson, et al., described a wireless device emergency service connection and panic button with a crime and safety information system. The patent further describes providing a conduit of information from an alarm button on a communication device via a wireless system to what appears to be either a computer or a cellular phone of a receiving party. In addition, location and timing information is provided. In reading the present patent I am led to believe that said patent is a system in which a user may activate an alarm condition, triggering a server to determine what other users are closest to said first user, the server meanwhile researching data on the location of said first user, there after a network of users is established that can best help said first user in his or her immediate event. However, it does not provide a means to call a 911 dispatch operator directly from any user device, nor does it not initiate a lock-down procedure to neutralize a campus crime perpetrator, nor does it provide interactive prompting messages to the user radio person, to assist them in activating other system functions, nor does it comprise a system that is not Web or cell phone based. Therefore, this patent is not relevant to the present inventor's patent application.

U.S. Pat. No. 7,813,750 to Hobby, described an emergency radio communication system incorporating integral public safety radio "bridging" capabilities. This system uses a bridge (or patch) to communicate directly between pubic safely radio systems and other radio systems, such as schools, hospital, and other facilities. In the Hobby invention, only a 911 operator may "patch" the communications from a school, hospital, or other facility to that of the public safety radio. But in the present patent application, the inventor describes a method whereby any user radio in a system of a school, hospital, government, or business complex is able to communicate from the USER's site, through a LINK-REPEATER, directly to a first responder. It should be apparent from the above description that no "bridge" or "patch" is being used in the current inventors application, and therefore the Hobby patent is not relevant to the current patent application.

U.S. Pat. No. 7,277,018 by Reyes, et al, described a computer enabled networked facility emergency notification management and alarm system. The patent further describes enabled system for monitoring events and upon a user's input, triggers alarms, including the capability of a wireless access device being able to initiate or be alerted to the triggering of an event alarm. After reading this patent I am of the opinion that the core of the invention centers around a secure computer network, which sends and receives text messages or alerts from such devices as cell phones, laptops, or computers in the aiding of selecting the appropriate protocol for dealing with an emergency. No where in said patent did I read any mention of voice communications between users, whether by cell phone, laptop, or computer. The system's intent is to have a data based protocol of accessing mapping, accessing lists of medical equipment and materials, but does address the issue of neutralizing a crime perpetrator on a campus. Further, I do not find any mention of any voice communications with a 911 emergency operator, nor any radio-to-radio voice communications with first responders. I do not see how this system can prevent, in any way, the killing of dozens of victims in the first 7-10 minutes of a mass shooting or a coordinated attack by a group of individuals on a facility.

U.S. Pat. No. 5,903,216 to Sutsos et al., described a security structure for unlocking the security for use by emergency response and authorize personnel. It described components and a method of using a scanner to scan the emergency response frequencies to first responders to unlock or open a gate when a scanner recognizes first responder's radio transmission on the restricted frequency. Of course the gate would also respond to recognized user's frequency and code like those provided in a garage door opener. The current invention has little or no relevant to the the present inventor's process, in that it does not describe the use of a conventional 2-way radio system, nor does it use of a repeater in said system, nor does it use of a LINK-REPEATER described by the present inventor's application. Further, it does not include a feature that allows a USER-RADIO's to automatically be connected to a 911 operator upon the initiation of a LOCK-DOWN procedure, nor does it facilitate the direct communication from a user to a first responder.

SUMMARY OF THE INVENTION

A system to neutralize a crime perpetrator on a campus, comprising a USER communicating to a USER-REPEATER, further communicating, through a LINK-REPEATER, to affect the neutralization of a campus crime perpetrator. Said neutralization shall be accomplished using a combination of containment, obstructive, and informational devices, including the use of a public address system, the lowering of a containment chain-link barrier, the releasing of thousands of 30-50 mm plastic balls in hallways, corridors, and vestibules, a direct inter-connection of a LINK-REPEATER to a first responder base station, and a automatic dialing to a 911 operator from a USER radio.

It is therefore a primary object of the present invention to provide a process whereby an individual USER holding a convention 2-way radio can totally LOCK-DOWN a CAMPUS.

It is another objective of the present invention to offer a very cost effective system to the public which can affect the saving of hundred, maybe thousands, of innocent lives.

It is another objective of the present invention to offer a solution to the current problem of a solution not involving vulnerabilities of outside persons "hacking" or "compromising" the integrity of the current system, as is often time the case when using the Internet, or when using a cell phones, or when using any other device that is connected to the Internet.

These and other objects of the present invention, will become apparent to those skilled in the art upon reading the accompanying description, drawings, and claims set forth herein. The headings provided herein are for the conve-

DETAILED DESCRIPTION OF THE INVENTION

1. Definitions

Figure 1:
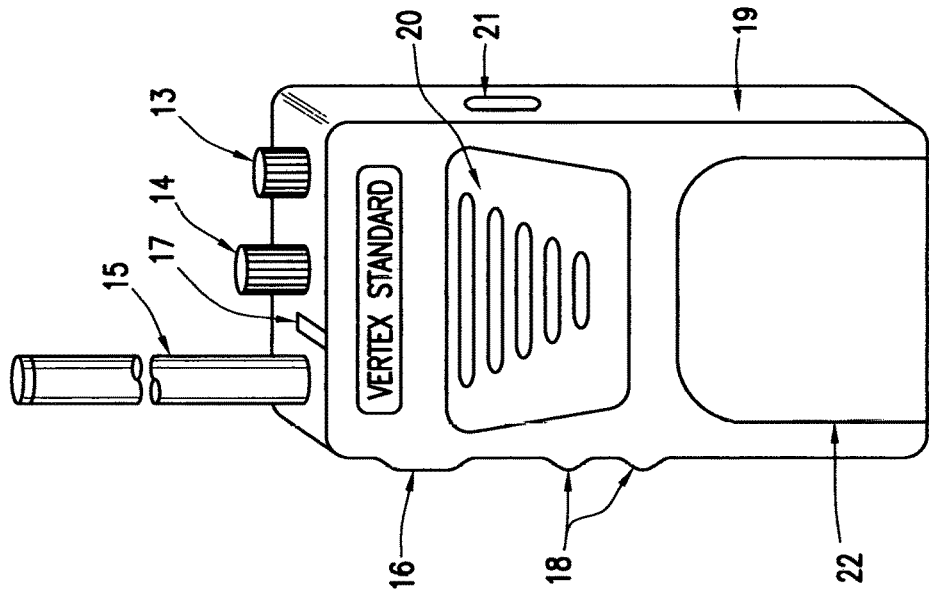
FIG. 1 shows a UNIQUE radio and its enhanced features.
Figure 2:
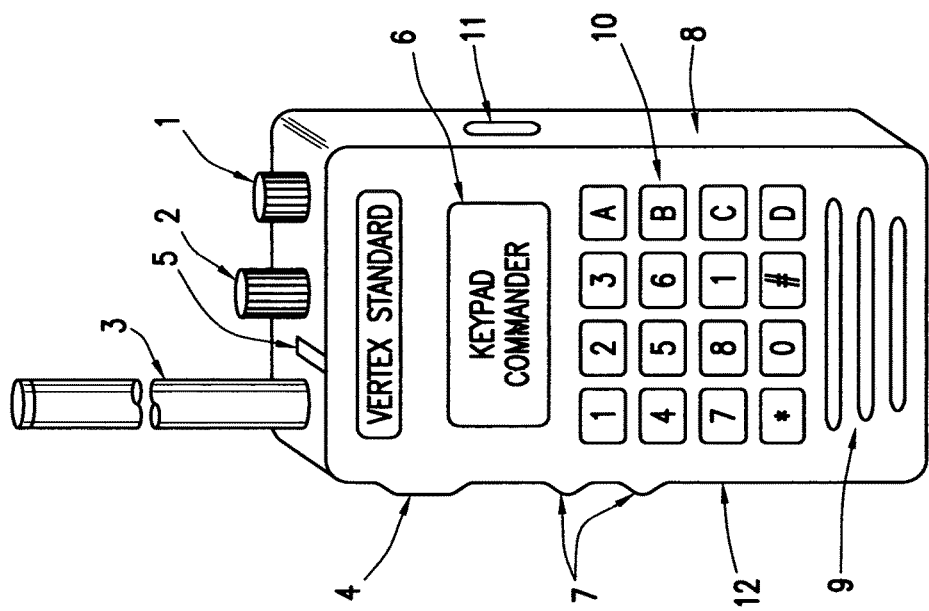
FIG. 2 shows a un-unique radio and its limited features.
Figure 3:
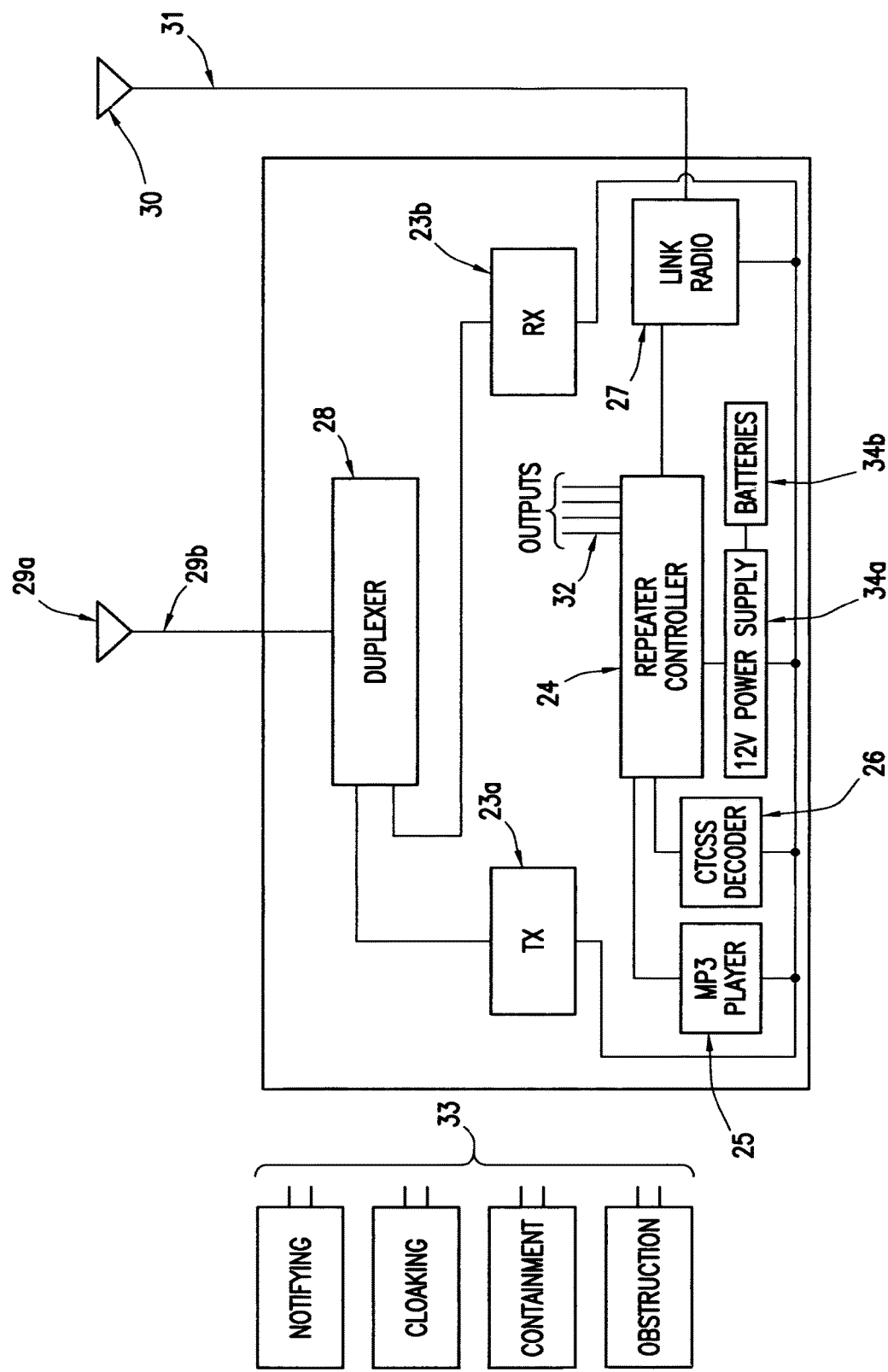
FIG. 3 shows the components of, and the inter-connections between, the elements making up the USER REPEATER.
Figure 4:
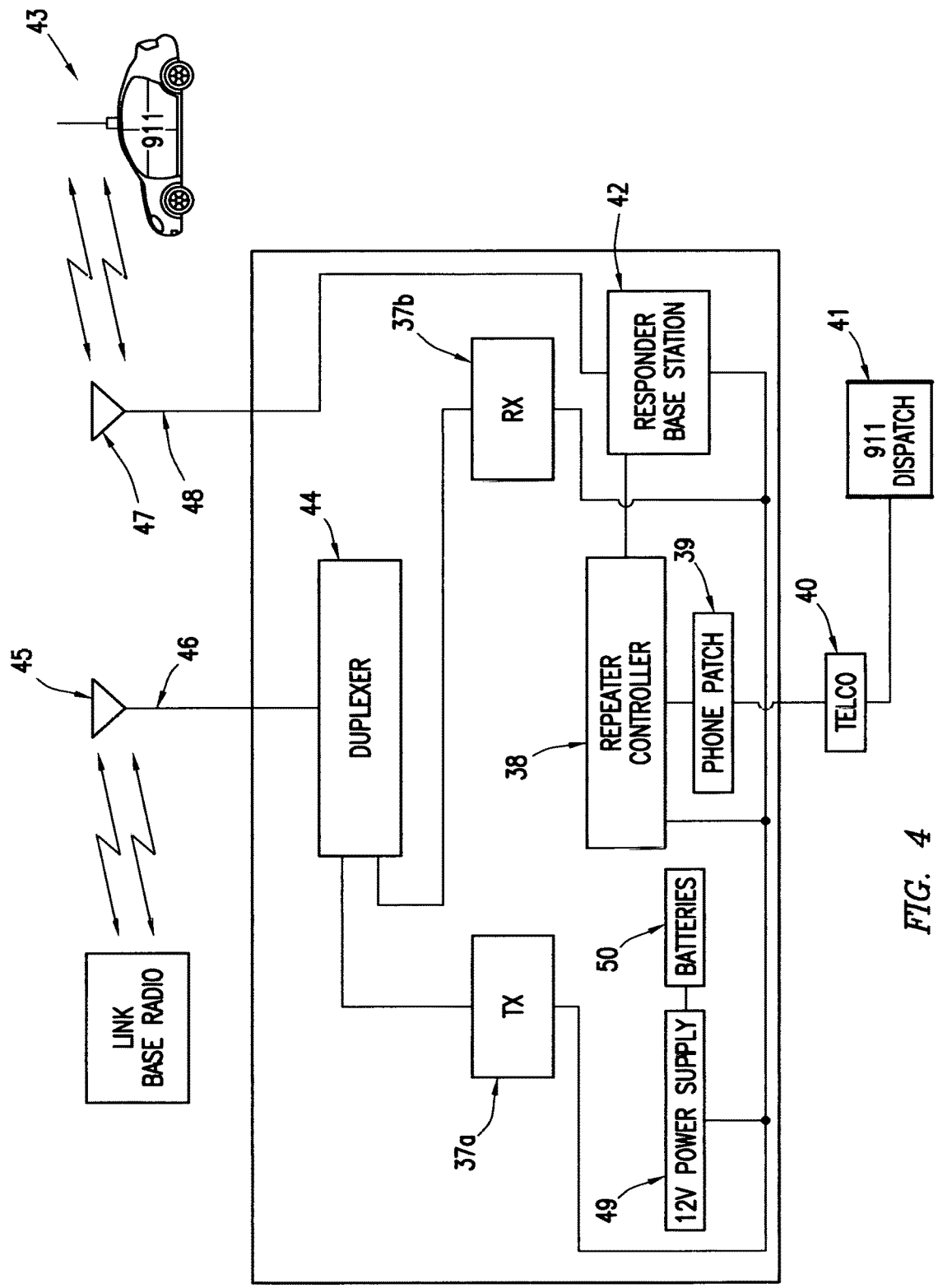
FIG. 4 shows the components of, and the inter-connection between, the elements making up the LINK REPEATER.

CAMPUS—A gathering place of 5 or more persons in a buildings, an open acreages, or other specifically defined densely population places, where educational instruction, entertainment, or business practices are performed.

UNIQUE RADIO—Personnel on a CAMPUS using a conventional VHF, UHF, or 900 MHz 2-way portable radio enhanced with a dual-tone multi-frequency (DTMF) keypad.

PANIC BUTTON—A "red" button located on top of UNIQUE RADIO that will send a 4 digit unique identification code of that particular radio upon pressed. Identification number of said radio shall be displayed on screen of any other UNIQUE RADIO upon receiving a signal of the right frequency and CTCSS (PL) tone.

CTCSS—Continuous Tone-Coded Squelch System.

DTMF—Dual-Tone Multi-frequency

MDC1200 SIGNALING—Motorola Data Communications low speed data system using 1,200 baud data rate. Mark and space tones are 1,200 Hz and 1,800 Hz, respectively. Used for unit ID, selective TX inhibit, radio check, and selective calling.

UN-UNIQUE RADIO—A VHF, UHF, or 900 MHz conventional 2-way radio without enhanced dual-tone multi-frequency (DTMF) keypad.

LINK RADIO—A VHF, UHF, or 900 MHz conventional 2-way radio that transmits and receives, to and from, a LINK-REPEATER.

USER REPEATER—A transmitter/receiver combination of VHF, UHF, or 900 MHz conventional 2-way mobiles radios that re-broadcasts, or repeats, the transmission of an incoming analog or digital modulated signal.

LINK REPEATER—A transmitter/receiver combination of VHF, UHF, or 900 MHz conventional 2-way mobile radios that re-broadcasts, or repeats, the transmission of an incoming analog or digital modulated signal, using a repeater controller with an auxiliary phone-patch module, a duplexer, a link radio, one or more first responder base station, the radios of which are connected to band specific antennas, the system being located at a site 500 or more feet above average terrain.

VOICE BOX—A module containing a MP3 based recorder/player, with up to 256 addressable audio files.

AUTO PHONE-PATCH—An accessory circuit board located in a repeater controller which can connect a repeater to a Telco phone line, thereby enabling said radio users to have the ability to make semi-duplex phone calls from their 2-way radio to any one at the end of the Telco phone line, including a pubic safety officer.

LOCK DOWN—A procedure of neutralizing a campus crime DOWN perpetrator by a process comprising, notifying students, teachers, administrators, entertainment attendees, workers, managers, or other involved personnel, of an eminent life threatening event, further comprising, the locking of doors and windows in response to a life threatening event, further comprising, automatically dialing 911 operator, further comprising, automatically interconnecting to first responders using dedicated first responder base stations, and further comprising, automatically initiating clocking, containment, and obstruction devices to preclude the crime perpetrators from observing or attacking intended victims.

2. Best Mode of the Invention

FIGS. 1 thru 9 show the best mode contemplated by the inventor according to the concepts of the present invention.

The inventor intended in this invention to take off-the-shelf devices, which, in most cases are the most cost effective purchases of said devices, and to assemble them in a unique fashion to accomplish a straight forward objective: to neutralized a CAMPUS crime perpetrator before he or she has a chance to kill or maim a significant number of persons.

In doing so, the inventor used his already acquired extensive knowledge in the 2-way radio communications field, and applied it to the above state problem.

The inventor has researched as much documented articles and as many related patents and patent applications as could be found on this subject, and has concluded that most prior art in the field is either to complex, therefore too costly, or does not in fact prevent the killing or maiming of individuals in the first 2-10 minutes of a crime in progress. The inventor realized that there is a need for a more immediate method of saving lives.

The present process invention meets the before mentioned needs and is comprised of three (3) basic components, comprising, a plurality of UNIQUE radios (FIG. 1) and of UN-UNIQUE radios (FIG. 2) of a VHF, UHF, or 900 MHz 2-way configuration; a USER REPEATER (FIG. 3), consisting of mobile radios, a repeater controller, a link radio, and band specific antennas, and, a LINK-REPEATER system (FIG. 4), comprising 2, conventional mobile 2 way radios, a repeater controller with an added AUTO-PHONE-PATCH circuit board, and additionally interconnected to a single or a plurality of base stations, the combination of which are located at a site 500 or more feet above average terrain.

The present apparatus is further described in detail.

A UNIQUE RADIO (FIG. 1), having a volume control (1), a frequency channel select control knob (2), a band specific antenna (3), a push-to-talk button (4), a PANIC-BUTTON (5), a alpha-numeric display window (6), 2, side of radio programmable function buttons (7), MDC1200 SIGNALING circuitry (8), a speaker (9), a dual-tone multi-frequency (DTMF) keypad (10), a programming/external speaker-microphone accessory jack (11), and a chassis frame (12).

A UN-UNIQUE RADIO (FIG. 2), having a volume control (13), a frequency channel select knob (14), a band specific antenna (15), a push-to-talk button (16), a PANIC BUTTON (17), 2, side of radio programmable function buttons (18), MDC1200 SIGNALING circuitry (19), a speaker (20), a programming/external speaker/microphone accessory jack (21), and a chassis frame (22).

A USER REPEATER, (FIG. 3), comprising 2, conventional VHF, UHF, or 900 MHz 2-way mobile radios, (23*a*) and (24*a*), further comprising, a micro-processor based repeater controller (24) interconnected to said repeater mobile radios, further comprising, a multiplicity of outputs from the repeater controller (32) which can activate the deployment of such devices as the inter-connection of VOICE-BOX (25) audio, as described in definitions, to an intercom system (52*a*), as the activation of a "fogging" device (57), as the activation of the lowering of a chain-link barrier (55) from a ceiling, and to the activation of the deployment of thousands of plastic balls from a plurality of containment enclosures (59). Repeater mobile radios connected to a notch-only mobile duplexer (28), which is further connected by low loss coaxial cable (29*b*) to a band specific antenna (29*a*) are mounted on the USER's building roof (38). A LINK-RADIO (27) is connected by low loss coaxial cable (31) to a band specific antenna (30), also located on the USER's building, further comprising a 12 volt direct current supply (34*a*) connected to a bank of deep cycle rechargeable back-up batteries (34*b*) able to power all of said equipment for more than 48 hours without any supply of standard 110 voltage from a utility source.

A LINK-REPEATER (FIG. 4) consists of 2, conventional 2-way mobile radios (37*a*) and (37*b*), matching the said LINK-RADIO frequencies, CTCSS (PL) tones, and any other coding required to communicate properly with said LINK-RADIO radios. A notch-only mobile duplexer (44) is connected to said mobile radios by interconnecting coaxial cables, further connected by low loss coaxial cable (46) to a band specific antenna (45) mounted on the roof of a building located at a height advantaged site 500 or more feet above average terrain. A micro-processor repeater controller (38) is interconnected to said mobile radios by conventional wiring, further comprising a single or a plurality of first responder base stations (42), connected by coaxial cable (48) to a band specific antenna (47), communicating to a emergency responder radio vehicle (43). An AUTO-PHONE-PATCH circuit module (39) is located within the repeater controller, which shall enable LINK-REPEATER, by said repeater controller, to connect to a Telco phone line (40) and shall automatically dial to a 911 operator. Further, the entire LINK-REPEATER system shall have a 12 volt direct current power supply (49), backed up by series of deep cycled rechargeable batteries (50).

Figure 5:
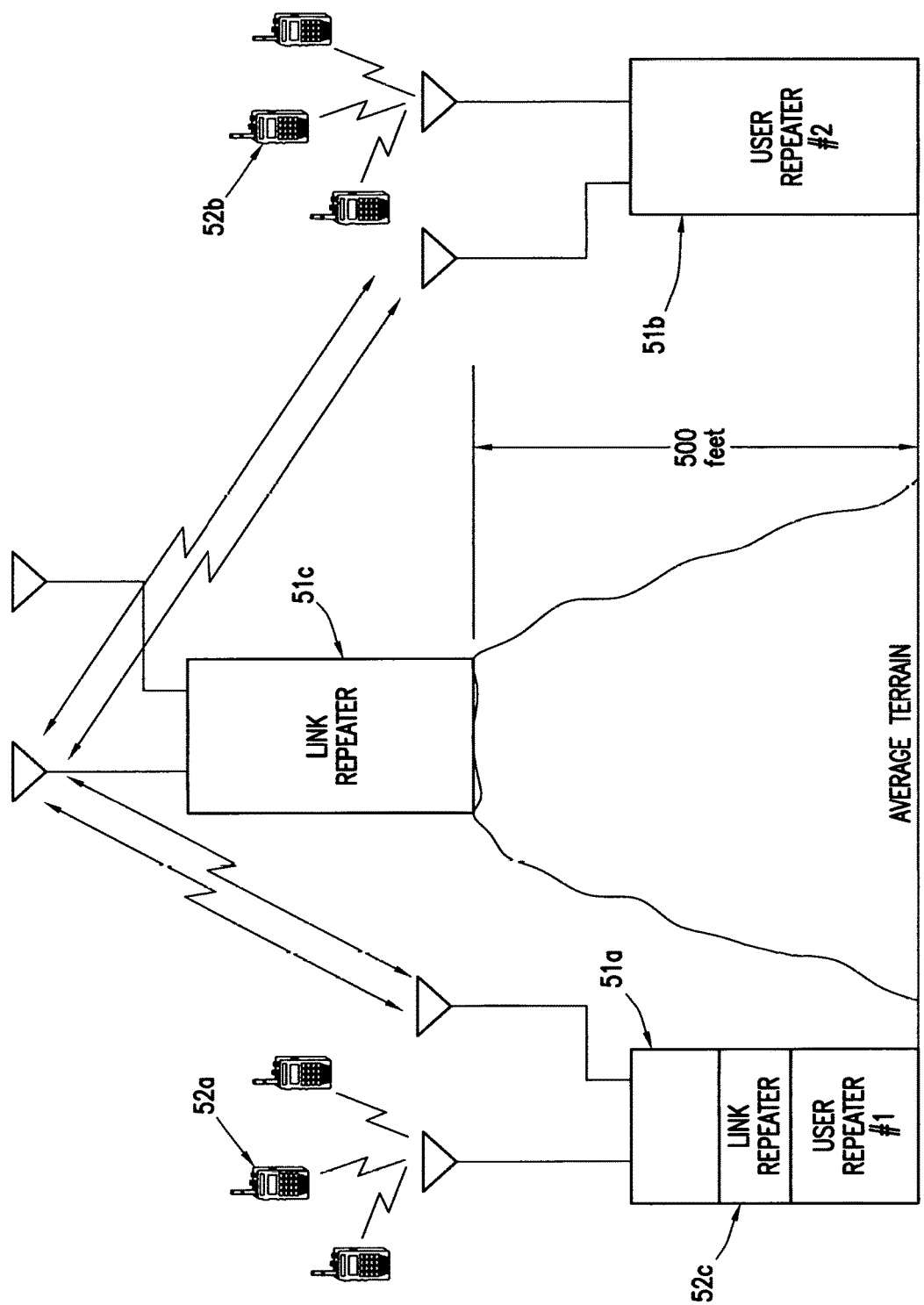
FIG. 5 shows the USER REPEATER communicating to the LINK REPEATER and the LINK-REPEATER further communicating to a plurality of USER REPEATERS.
Figure 6:
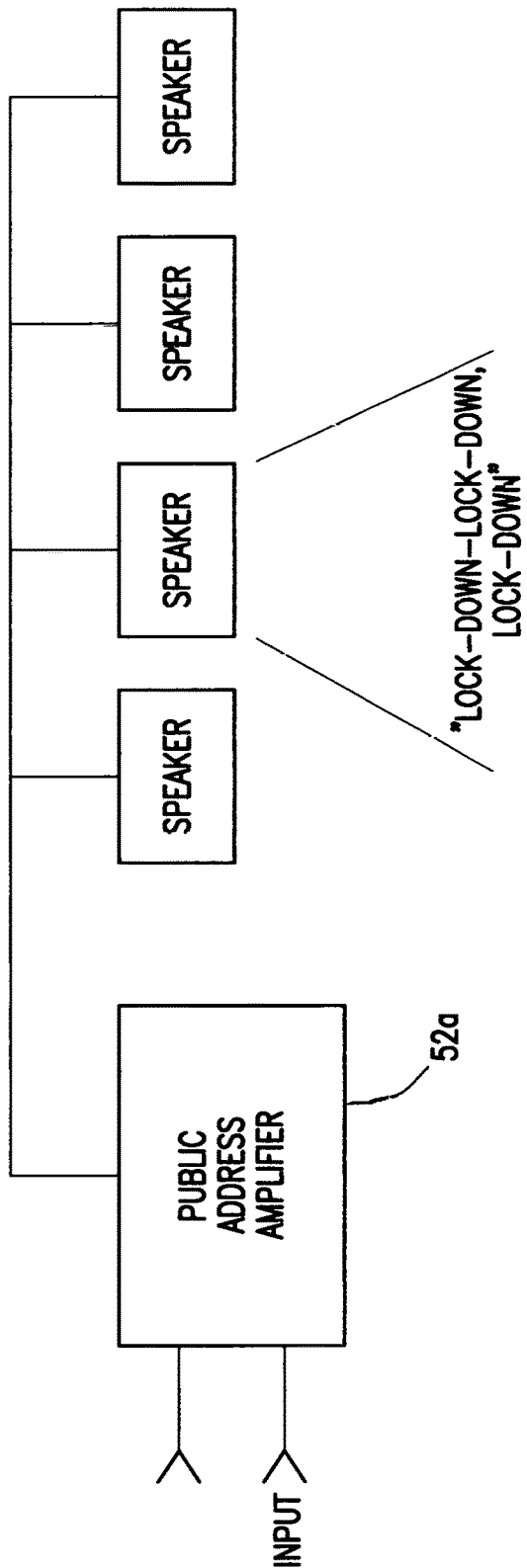
FIG. 6 shows a diagram of a notification device, such as a public address system.

A total operating system is, shown in FIG. 5, of 2 or more USER REPEATERS (51*a*) and (51*b*), communicating to each other through a shared LINK-REPEATER (51*c*). The signal of which shall emanate from LINK-RADIO's band specific antennas to LINK-REPEATER antenna. Further the USER radios (52*a*) and (52*b*) shall communicate to the USER-REPEATER through USER-REPEATER antenna a notifications device as shown in FIG. 6, similar to a public address system (52*a*), further comprising.

Figure 7:
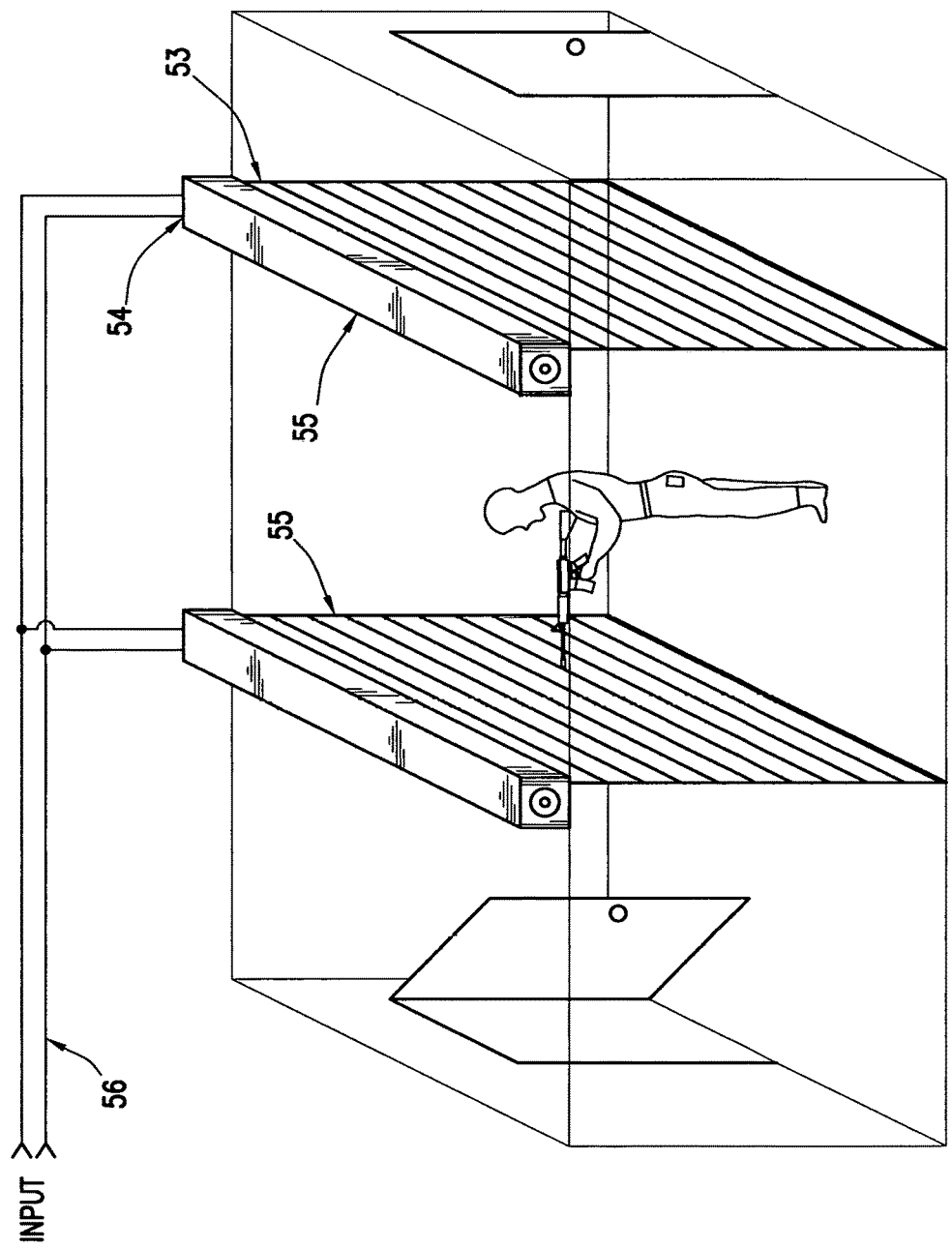
FIG. 7 shows the embodiment of a chain-line barrier device and how said barrier might be deployed from a ceiling.

A containment barrier device as view in FIG. 7, comprises a housing enclosure (55), mounted in, or attached to, the ceilings of various hallways, corridors, or vestibules, containing a motor which shall unroll said chain-link barrier (53) until same comes in contact with the the floor of said hallway, corridor, or vestibule, upon which time it shall come to rest. There is a process for retracting same using an alternate from said controller, by signaling said motor to operate in the reverse direction, the motor of which is enabled fonrvard, or enable in reverse as a result of a signal from one or more outputs of the USER-REPEATER controller.

Figure 9:
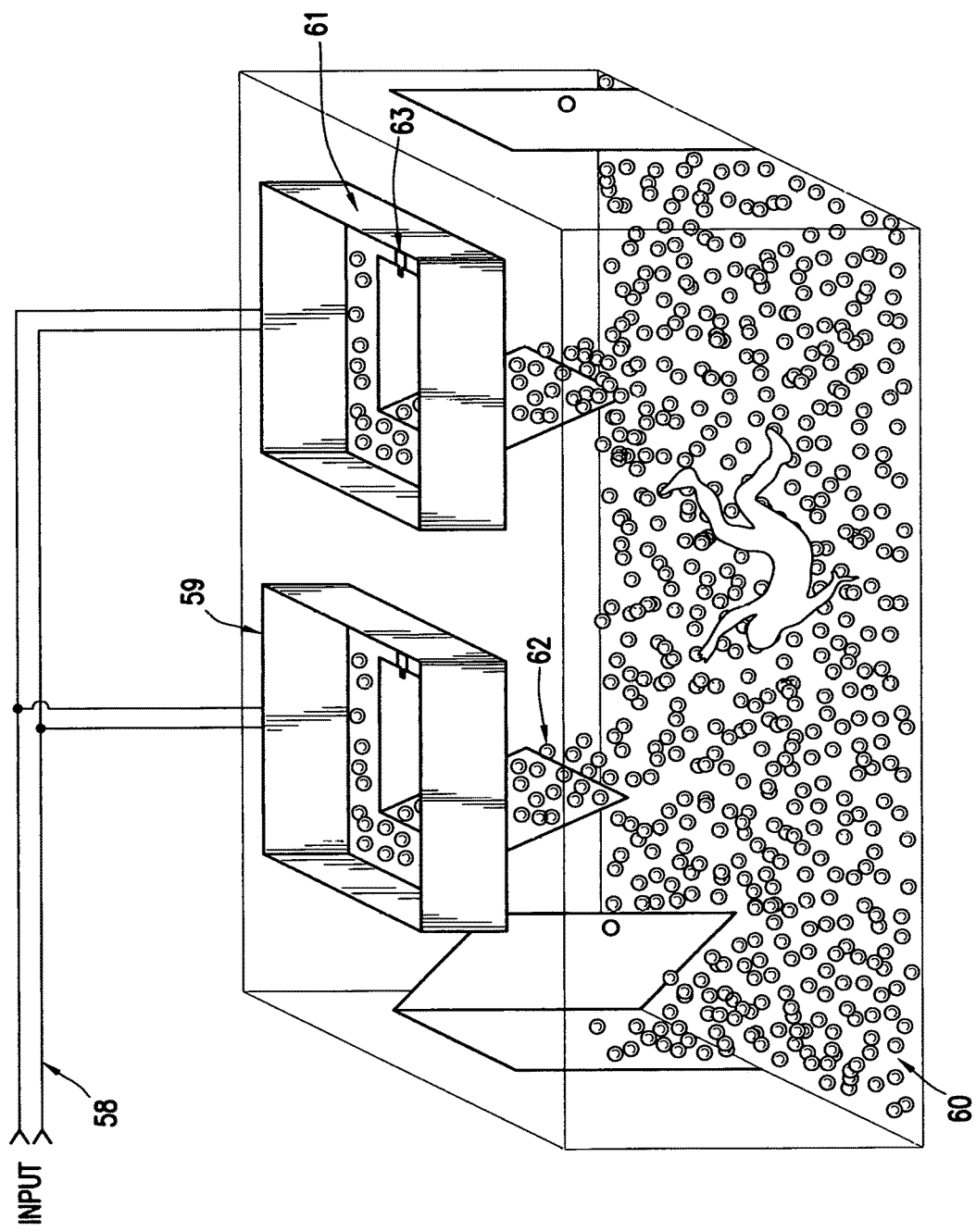
FIG. 9 shows the embodiment of a obstruction device using a large quantity of 30-50 mm plastic balls dropped from a ceiling.

A containment enclosure (59), as view in FIG. 9, mounted in, or attached to, a ceiling in a hallway, a corridor, or vestibule, which shall hold thousands of 30-50 mm plastic balls (60), which shall be released by a trap door (62) upon the retraction of a bolt (63) powered by a solenoid, activated by a triggering signal from one or more outputs from a signal coming from the USER-REPEATER controller, further comprising.

Figure 8:
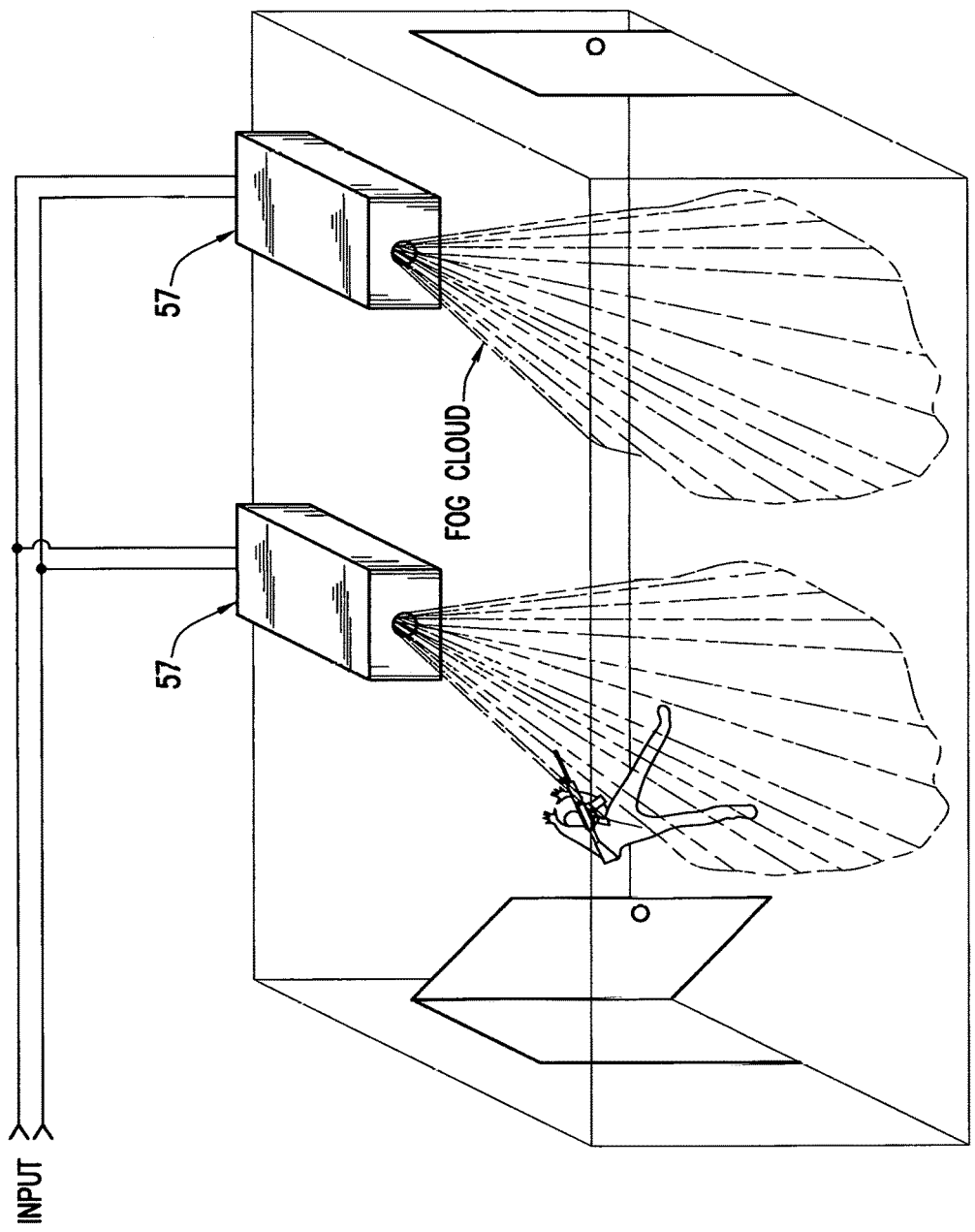
FIG. 8 shows the embodiment of a "fogging" device, and how said device might be mounted in a ceiling.

A "fogging" device as shown in FIG. 8, is located in strategic places in walls, or in ceilings, of hallways, corridors, or vestibules of a CAMPUS, which shall be enabled as a result of a triggering signal coming from one or more outputs of a USER-REPEATER controller, the cloud of which shall obscure within 30 seconds, the view a campus crime perpetrator might have of possible shooting victims, and which shall be harmless to humans.

The system, as described enables a singe USER at a school, a entertainment complex, a government complex, a municipal complex, a airport complex, or a business complex, to have the capability with the previously described UNIQUE or NON-UNIQUE radios, to initiate a LOCK-DOWN sequence having only said radio in his or her hands, irrespective of whether USER is close to a standard convention land-line telephone, or is safe or unsafe to use said convention phone device because USER may be prevented from using same because of sustaining gunfire or having the lack of proximity to said local line land device.

The UNIQUE and UN-UNIQUE radio shall have as a standard purchased feature, MDC1200 signaling, and a PANIC BUTTON on said radio which shall permit a USER who is injured, yet still upright, to trigger an alarm function in the USER REPEATER controller, which shall prompt another USER or other USERs to attempt to locate and help said person who presses the "man-down" button on a UNIQUE or UN-UNIQUE radio, and shall alert those USER persons to the identification of said person activating a "man-down" alarm. The result being that other USER personnel shall come go to the aid of the person who has activated the "man-down" alert. Further, said "man-down" alarm shall start an initialization of a LOCK-DOWN procedure, where the USER REPEATER controller in conjunction with the VOICE-BOX shall send radio transmitted message over the USER REPEATER to the effect, "do you wish to initiate a LOCK-DOWN procedure, and if not, please cancel said LOCK-DOWN procedure within 10 seconds", which shall allow any USER to send a unique command to the USER REPEATER controller that shall cancel said LOCK-DOWN procedure.

The UNIQUE and UN-UNIQUE radios contain circuitry in said radios which shall, in the case where a USER who falls to the ground because of and injury and said radio shall stay in a position of less than 45 degrees above horizontal for more than a predetermined time, suggesting USER injury or disability, initiating a LOCK-DOWN procedure after a predetermined time, but which may be cancelled by the said USER hearing an alert tone from said radio, or by any USER who can send a unique code to the USER REPEATER controller to cancel the LOCK-DOWN initiation.

3. How to use the invention

A school, a municipality, a government, or a business entity may use this invention to greatly improve the level of said institution's ability to protect themselves against a campus crime perpetrator. in the event that said perpetrator is recognized on campus, any personnel with a UNIQUE or NON-UNIQUE radios (FIGS. 1 and 2) can initiate a LOCK DOWN procedure using their conventional 2-way radio portable. Most schools at this time are currently using 2-way radios to perform ancillary tasks such as traffic control, contacting maintenance personnel, and contacting teachers on a playground. Therefore, it is a logical further step to incorporate this already accepted technology in an extended application that can have a great impact in reducing the number of killings on various campuses. The cost of the invention is considerably lower than any other solution currently available. When a USER sees a potential crime perpetrator, he or she may activate a LOCK-DOWN procedure by keying the UNIQUE or UN-UNIQUE radio and pressing a predetermined DTMF code on a UNIQUE radio, or perform a sequence of inter-active responses to voice prompts on a UN-UNIQUE radio.

What is claimed is:

1. A system for initiating a lockdown at a venue comprising:
   a plurality of unique 2-way portable radios and un-unique portable 2-way radios wherein each radio has a panic button;
   a plurality of user repeaters located at the venue wherein each repeater is capable of communicating with the plurality of unique and un-unique 2-way portable radios;
   a link repeater remotely located from the venue and in communication with the plurality of user repeaters, wherein the link repeater initiates a call to a first responder upon receipt of a link signal from the user repeater;
   a notification device at the venue to broadcast a message in response to a lockdown event;
   a containment device for restricting access in the venue wherein the containment device is activated in response to the lockdown event; and
   an obstruction device for interfering with the movement of a perpetrator in response to the lockdown event;
   wherein the activation of the panic button on any portable radio transmits a lockdown signal to the user repeater to initiate the lockdown event, wherein the user repeater triggers the notification device, the containment device, the obstruction device, and sends the link signal to the link repeater in response to the receipt of the lockdown signal and wherein the portable radio that initiates the lockdown event is in communication with other portable radios when the lockdown event is initiated.

2. The system in claim 1, wherein the obstruction device is a fogging device or a device that drops balls on pathways in the venue.

3. The system of claim 1, wherein the containment device is a barrier or door which may be lowered or locked to restrict access.

4. The system of claim 1, wherein the user repeaters transmits a message to the other portable radios in response to the lockdown event.

5. The system of claim 1, wherein the each portable radio is capable of transmitting a 4 digit DTMF code to the user repeater to identify the portable radio.

6. The system of claim 1, wherein one of the user repeaters transmits a message to portable radios at a different venue via the system in response to the lockdown event.

7. A method of using the system in claim 1 comprising:
   activating the panic button on one of the portable radios to initiate the lockdown event;
   sending a signal from the actuated portable radio to at least one user repeater wherein the user repeater actuates the notification system, the containment device, the obstruction device, sends a message to other portable radios, and sends an alert to the link repeater;
   initiating a call to the first responder by the link repeater in response to the alert from the user repeater; and
   connecting the first responder to the portable radio that initiated the lockdown event.

* * * * *